No. 758,717. PATENTED MAY 3, 1904.
L. STRASSER.
SCALE REMOVING DEVICE.
APPLICATION FILED AUG. 8, 1903.
NO MODEL.

WITNESSES:

INVENTOR
L. Strasser.
by
Attorney

No. 758,717.

Patented May 3, 1904.

UNITED STATES PATENT OFFICE.

LOUIS STRASSER, OF COLUMBUS, OHIO.

SCALE-REMOVING DEVICE.

SPECIFICATION forming part of Letters Patent No. 758,717, dated May 3, 1904.

Application filed August 8, 1903. Serial No. 169,010. (No model.)

*To all whom it may concern:*

Be it known that I, LOUIS STRASSER, a citizen of the United States, residing at Columbus, in the county of Franklin and State of Ohio, have invented a certain new and useful Improvement in Scale-Removing Devices, of which the following is a specification.

It is a well-known fact and objectionable feature that the steam and ammonia condenser pipes of refrigerating plants quickly accumulate scale upon the exterior thereof; and it is the essential object of the present invention to provide a conveniently-manipulated device for effectually removing such scale from the pipes without interfering with the operation of the plant.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
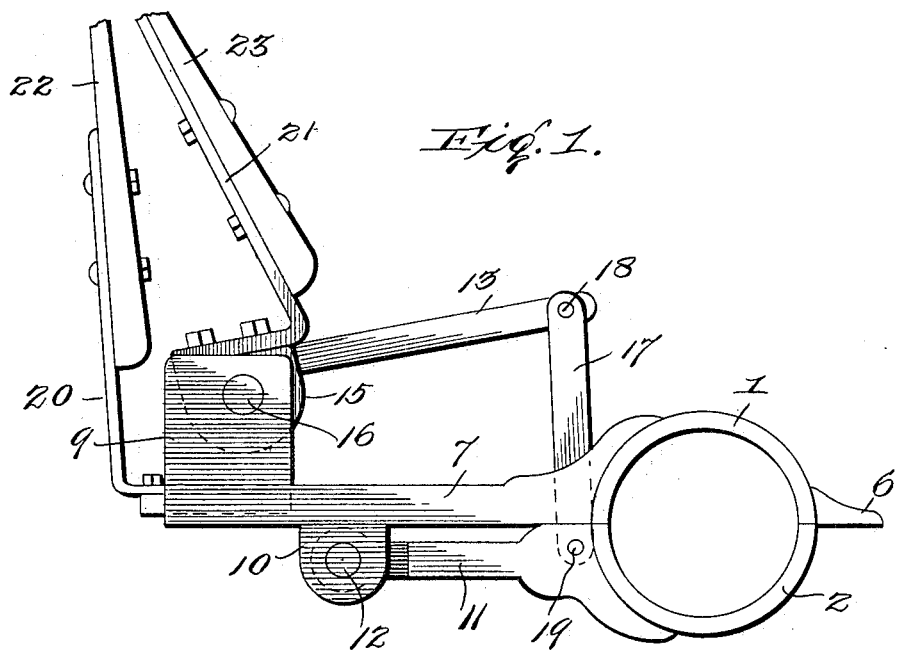
Figure 2:
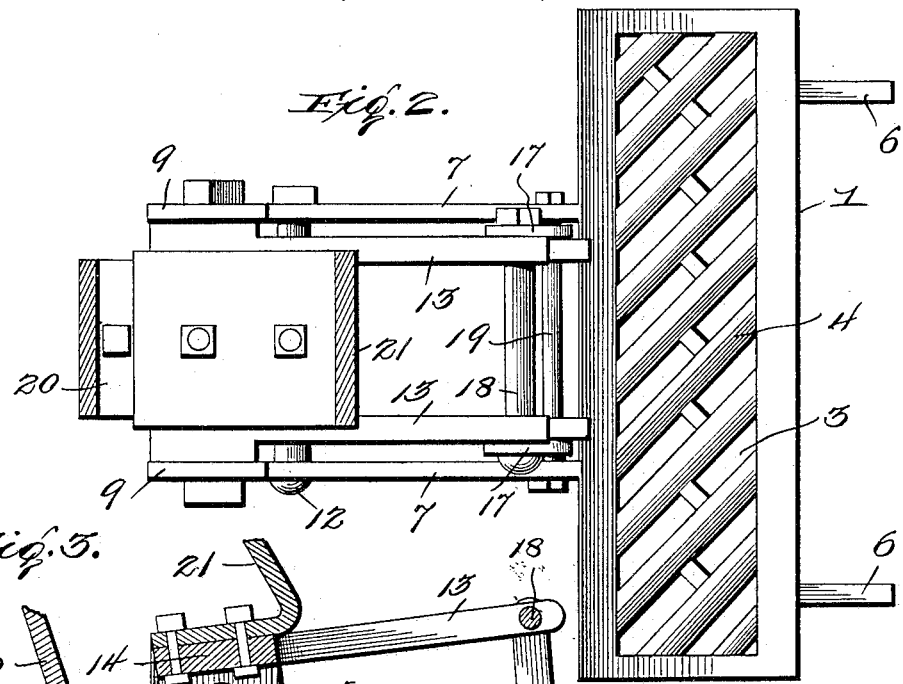
Figure 3:
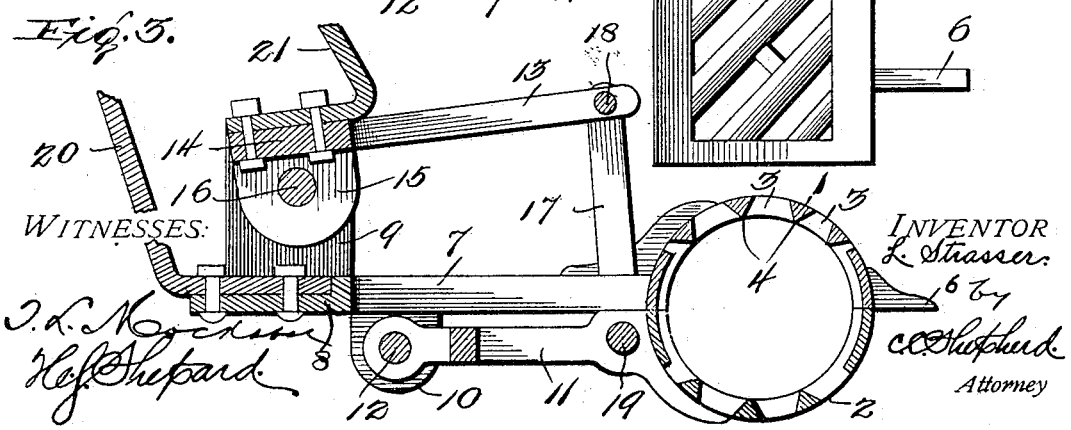

In the drawings, Figure 1 is a side elevation of the device of the present invention. Fig. 2 is a top plan view thereof. Fig. 3 is a central longitudinal sectional view of the device.

Like characters of reference designate corresponding parts in each and every figure of the drawings.

In carrying out the present invention upper and lower semitubular jaw members 1 and 2 are provided to embrace the pipe to be cleaned. Each jaw is provided with a series of diagonal slots 3, which increase in width inwardly, and thereby form scraping-teeth 4, which are substantially triangular in cross-section, with their sharp edges at the inner periphery of the jaw, so as to engage the scale and scrape it from the pipe. The outer longitudinal edge of the upper jaw is provided with a pair of projections or shoulders 6 for a purpose as will be hereinafter described.

The upper jaw member has a rigid shank 7 projected rearwardly therefrom and made up of a plurality of parallel bars connected at their rear ends by a cross-bar 8. From the ends of the cross-bar rise bearing-ears 9, and immediately in front of these ears are pendent bearing projections 10, between which the rear end of the shank 11 of the lower jaw is pivoted by means of a transverse pivot-bolt 12, whereby the two jaws have a hinged connection.

Located above the shank members is a pair of vertically-swinging arms 13, the rear ends of which are connected by a cross-bar 14, provided with pendent terminal ears 15, fitting between the ears 9 and pivoted thereto by means of a transverse pivot-bolt 16. From the front end of each arm 13 depends a link 17, having a pivotal connection 18 with the arm and pivotally connected at its lower end with the shank 11 of the lower jaw by means of a transverse pivot-bolt 19, which serves for both links.

For convenience in manipulating the device a substantially L-shaped handle-bracket 20 is connected to the cross-bar 8 of the upper shank 7, and a reversed substantially L-shaped bracket 21 is secured to the cross-bar 14 of the arms 7, and handle-bars 22 and 23, respectively, of suitable length, are connected to the brackets.

When the jaws have been opened, the device is advanced toward the pipe to be cleaned until the projections or shoulders 6 rest upon the pipe as a support, and then the device is still farther advanced until the two jaws embrace the pipe, after which the handle 23 is swung rearwardly, thereby swinging upwardly the lower jaw 2 upon the bolt 12 as a center and through the medium of the arms 13 and the links 17 to grip the two jaws snugly upon the pipe. By working the device back and forth upon the pipe by manipulation of the handles the teeth or scrapers 4 will act to scrape the scale from the pipe, the slots or openings between the teeth serving to permit of the scale escaping from the jaws without choking the same.

Having thus described the invention, what is claimed, and desired to be secured by Letters Patent, is—

1. A device of the character described, comprising a pair of semitubular pivotally-connected jaws having their inner faces provided with scrapers and also provided with openings for the escape of scale, and handles for swinging the jaws upon their pivotal connection and for working the device upon a pipe.

2. A device of the character described, comprising a pair of semitubular jaws having diagonal slots, the portions of the jaws between the slots being formed into scrapers upon the inner faces of the jaws, and handles connected to the jaws for manipulating the same.

3. A device of the character described, comprising a pair of jaws having scrapers upon their inner faces, shanks carried by the jaws and pivotally connected, a bearing upon one of the shanks, an arm pivoted upon the bearing, a link connecting the arm to the other shank, a handle upon the first-mentioned shank, and a handle for the arm.

4. A device of the character described, comprising a pair of scraper-jaws, a rigid shank upon the upper jaw and provided with upstanding and pendent bearings, a rigid shank upon the lower jaw and pivoted to the pendent bearings, a pair of swinging arms having a cross-bar connection pivoted to the upstanding bearings, links pivotally connected to the arms and the lower shank, and handles connected respectively to the rear end of the upper shank and the cross-bar of the arms.

5. A device of the character described, comprising a pair of connected semitubular jaws having diagonal scrapers on their inner faces and slots for the passage of loosened scale, and handles connected to the jaws for manipulating the same.

LOUIS STRASSER.

In presence of—
CLIFTON C. EVANS,
A. L. PHELPS.